United States Patent Office 2,779,912
Patented Jan. 29, 1957

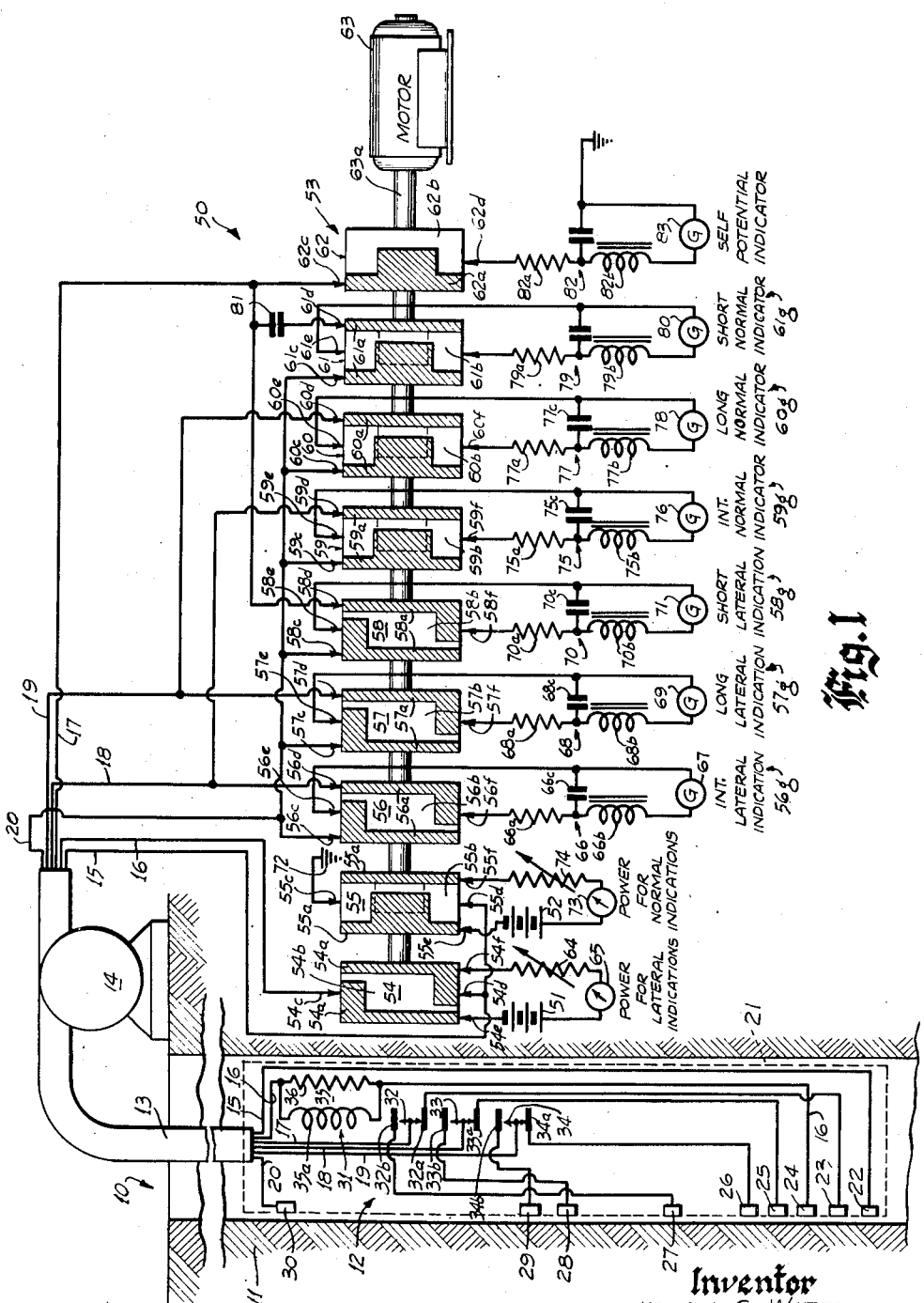

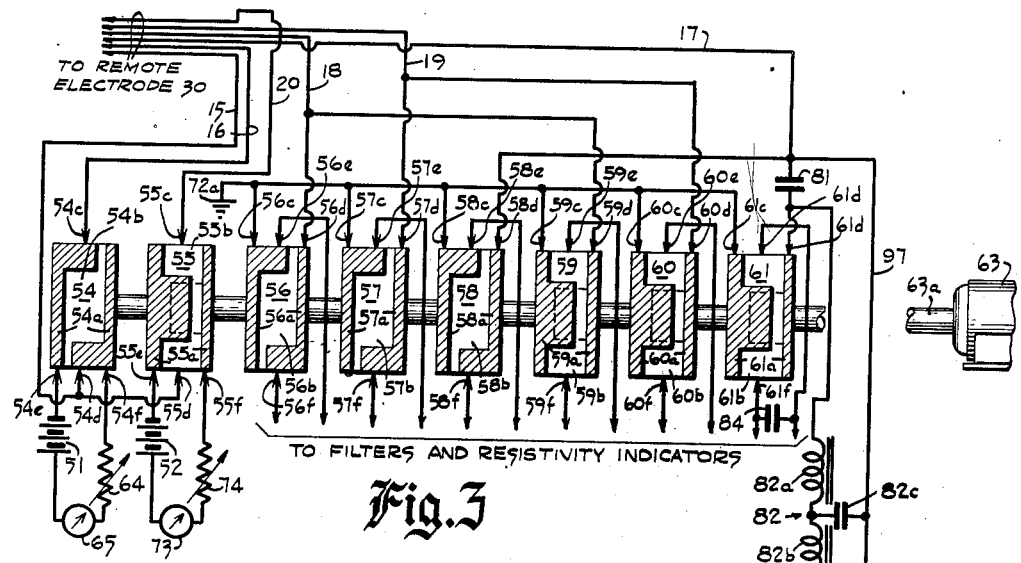
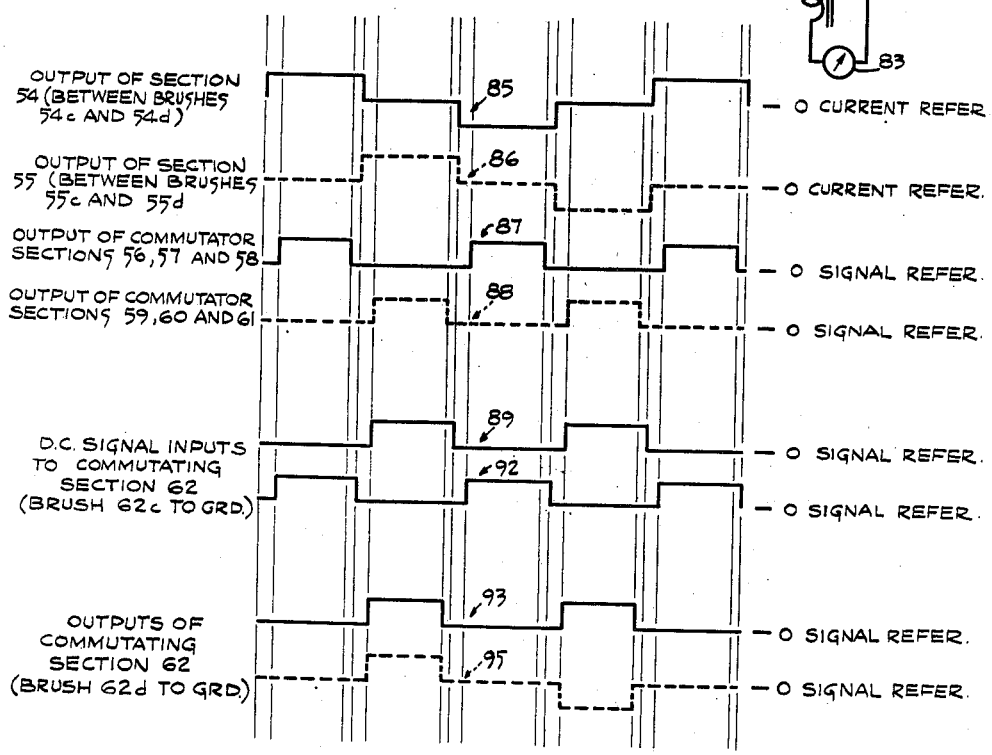

2,779,912

ELECTRICAL WELL LOGGING SYSTEM

Henry C. Waters, Houston, Tex., assignor to Perforating Guns Atlas Corporation, Houston, Tex., a corporation of Delaware Application January 24, 1955, Serial No. 483,514

31 Claims. (Cl. 324—1)

This invention relates generally to an electrical system for logging wells and more particularly to a new and improved system for simultaneously obtaining a plurality of indications of the electrical characteristics of earth formations surrounding a borehole.

In logging wells by determining the resistivity of strata surrounding the well bore, it is customary simultaneously to obtain a plurality of resistivity curves, designated "normal" curves and "lateral" curves, each providing information particularly pertinent to one or more of the strata normally penetrated by the borehole. Thus, for example, the "normal" curves generally provide information concerning the location, extent and resistivity of the various formations close to and adjacent the borehole. The "lateral" curves are useful primarily to determine the resistivity of formations at a greater distance from the borehole where the resistivity measurements are not influenced by the effects of the borehole and the borehole fluid. Both the normal and lateral curves have their limitations under certain conditions and are used to supplement each other when such conditions arise. The "normal" curves are produced by employing facilities comprising a pair of current electrodes spaced relatively far apart, and a potential electrode located near one of the current electrodes, the other potential electrode being remotely located. The "lateral" curves, on the other hand, result from the use of facilities including a pair of closely spaced current electrodes relatively close to one potential electrode, the other potential electrode being remotely located. In systems presently in use, these "normal" and "lateral" curves are obtained by investigation apparatus or downhole equipment, including the aforementioned spaced current and potential electrodes, which is raised and lowered within the borehole by means of a multi-conductor cable for connecting the current electrodes to energizing apparatus and for connecting the potential electrodes to indicating apparatus located at the earth's surface.

It has long been recognized that there are many different electrode spacings for producing these "normal" and "lateral" curves each possessing peculiar advantages and limitations with respect to particular non-homogeneous formations which may be encountered in a well bore. The various spacings, depending upon the relative distances between electrodes, are often referred to as "short," "intermediate" and "long" normal or lateral curves. Since it is virtually impossible to predict which types of curves will be best suited for investigating the formations surrounding any particular well bore, it is generally desirable to produce as many of the above described "normal" and "lateral" resistivity curves as possible as the investigation apparatus is lowered or raised within the borehole. In order to provide an optimum determination of the formations traversed by the borehole, it is also desirable to obtain, simultaneously with the various resistivity curves, an indication portraying variation in natural earth potential which may be termed a self-potential or spontaneous potential curve.

In an attempt to provide a maximum number of resistivity curves most electrical logs are, at the present time, performed with a six-conductor cable but, despite this relatively large number of conductors, only three resistivity curves and one self-potential curve are simultaneously produced. Obviously, the number of resistivity curves obtained could be further increased by providing additional potential or current electrodes in the downhole equipment while, at the same time, employing a corresponding number of additional conductors in the cable. It has long been recognized, however, that a large number of conductors in a cable introduces a number of attendant disadvantages in that such a cable is expensive, is subject to short circuiting and is inaccurate for depth measurements in a well due primarily to cable stretch as a result of its excessive weight. Accordingly, the use of additional conductors in the cable does not afford a practical solution to the problem of increasing the number of resistivity curves obtained during the log.

Accordingly, one of the principal objects of the present invention is to provide a new and improved well logging system of the above character which obviates the described disadvantages of prior systems.

It is also an object of the present invention to provide a well logging system in which the number of resistivity curves obtained is increased without increasing the number of conductors in the cable leading to the downhole equipment, or, alternatively, to reduce the number of conductors in the cable while still obtaining all of the resistivity curves customarily produced by the prior art systems.

Another object of the present invention is to provide new and improved apparatus for accurately obtaining a maximum number of indications of earth resistivity and natural earth potential which is characterized by relatively simple, inexpensive construction.

Yet another object of the present invention is to provide an electrical well logging system in which the number of resistivity curves obtained is increased by increasing the number of electrodes in the downhole equipment but which does not require a corresponding increase in the number of conductors in the cable extending from the downhole equipment to indicating and translating facilities at the earth's surface.

A further object of the invention is to provide an electrical well logging system of the character described above employing a multi-conductor cable extending from the surface of the earth to spaced potential and current electrodes carried by investigation apparatus in the borehole for simultaneously indicating, at the earth's surface, a plurality of different electrical characteristics of the earth formations traversed by the borehole by periodically connecting certain of the cable conductors to different ones of the spaced potential electrodes in synchronism with the flow of current to the current electrodes.

A still further object of the present invention is to provide apparatus of the character just described in which the periodic connection between the cable conductors and the spaced potential electrodes is controlled by the current flow to at least one of the current electrodes.

Another object of the invention is to provide new and improved apparatus for simultaneously transmitting through a cable suspended in a borehole a plurality of signals which are related to changes in a plurality of subjects of interest being investigated with a minimum number of cable conductors.

The invention both as to its organization and method of operation, together with further objects and advantages thereof will best be understood by reference to the specication taken in conjunction with the accompanying drawings in which:

Fig. 1 diagrammatically illustrates an electrical well logging system embodying the present invention;

Fig. 2 shows a group of curves illustrating the time relationship between signals appearing at various points of the apparatus shown in Fig. 1;

Fig. 3 diagrammatically illustrates a broken away portion of the apparatus shown in Fig. 1 in order to depict an alternative embodiment of the present invention.

Referring now to the drawings, and particularly to Fig. 1 thereof, the present invention is there illustrated as embodied in apparatus for electrically logging a well or borehole 10 in order to determine the characteristics of the earth formations 11 traversed by the borehole. It will be understood that the borehole 10 may contain drilling fluid with mud suspended therein which generally remains in the hole after the removal of the drilling equipment although such fluid has not been illustrated in the drawings.

Investigation apparatus or downhole equipment, indicated generally by the reference character 12, is carried upon a multi-conductor cable 13 whereby it may be raised and lowered within the borehole. To this end, the cable 13 is trained over a sheave 14 at the earth's surface and may be wound upon a suitable reel (not shown) in customary manner. The cable 13 is illustrated as comprising six electrical conductors, designated 15 to 20, inclusive, although it should be understood that the cable may actually include any desired number of conductors, the particular number selected being a function of the number of resistivity curves to be produced as will be apparent from the ensuing description. These conductors, as indicated above, terminate at one end in the investigation apparatus 12 and at the other end are connected to surface equipment designated generally by the reference character 50.

The investigation apparatus includes a housing 21 containing a plurality of spaced, electrically insulated electrodes, these being illustrated as nine in number and being designated by the reference characters 22 to 30, inclusive, although any number of such electrodes may actually be employed as determined by the number of conductors in the cable 13. The outer surface of each of the electrodes is preferably exposed to the outside of the housing 21 in order to effect electrical contact through the borehole fluid with the earth formations 11 adjacent the well bore.

The electrodes 22 and 24 are termed current electrodes by virtue of the fact that they induce a flow of current from the conductors 15 and 16, respectively, through the formations in a manner to be described more fully hereinafter. The electrodes 23 and 25 to 30, inclusive, are termed potential or probe electrodes since they function to measure potential differences existing between various points in the borehole as a result of the above-described current flow. Due to the resistivity measurements which they produce, the electrodes 23, 25 and 26 are termed "normal" potential electrodes, while the electrodes 27, 28, and 29 are termed "lateral" potential electrodes. The potential electrode 30, which is permanently connected to the surface equipment 50 through cable conductor 20, is positioned remotely with respect to the other potential electrodes and establishes a reference point for use in producing the various normal and lateral resistivity measurements described hereinafter.

In order to economize upon the number of conductors required in the cable 13, there is provided switching mechanism 31 for alternately connecting each of the conductors 17, 18, and 19, first to one of the "lateral" potential electrodes and next to one of the "normal" potential electrodes. To this end, the electrodes 23 and 27 are respectively connected to stationary contacts 32a and 32b of relay 35 of the switching mechanism 31, the electrodes 25 and 28 are respectively connected to fixed contacts 33a and 33b and the electrodes 26 and 29 are respectively connected to fixed contacts 34a and 34b. Movable contacts or poles 32, 33, and 34, which are respectively connected to conductors 17, 18, and 19, are operated in synchronism with the flow of current to the current electrodes in a manner to be described more fully hereinafter in order to engage alternately their associated fixed contacts. In this manner, each of the three conductors connected to the movable contacts is electrically connected to one of the "lateral" potential electrodes during a first interval of operation and is connected to one of the "normal" potential electrodes during a second interval of operation. As a consequence, potential differences existing between each of the "lateral" potential electrodes and the remote electrode 30 are measured during the first interval while potential differences existing between the "normal" potential electrodes and the remote electrode 30 are measured during the second interval. Thus, each "normal" potential electrode shares a cable conductor with one of the "lateral" potential electrodes thereby permitting a reduction in the number of conductors required in the cable or, alternatively, facilitating the production of an increased number of resistivity measurements without a consequent increase in the number of cable conductors.

The equipment provided at the surface for producing the resistivity measurements of the subsurface formations includes a pair of sources 51 and 52 of direct current together with a commutator 53 comprising a plurality of commutating sections designated 54 to 62, inclusive. These commutating sections, which are rotated in synchronism due to the fact that they are carried upon a common shaft 63a driven by motor 63, are illustrated as being nine in number although, from the ensuing description, it will become apparent that actually any desired number may be provided depending upon the number of resistivity measurements desired. Obviously the commutator sections may be driven at any desired and substantially constant speed, but preferably this speed is in the order of fifteen revolutions per second. Although the commutating sections have been shown as positioned in spaced apart relationship, it should be understood that this has been done merely to illustrate the invention and that actually they may be oriented one beside the other on the shaft 63a. Each of the commutating sections 54 to 61, inclusive, includes a pair of spaced electrically insulated conducting portions illustrated by the cross hatched lines and an insulating portion which is not cross hatched, the conducting portions being designated by a reference numeral corresponding to that of its associated commutating section suffixed by the letter a and the insulating portion bearing a corresponding reference numeral suffixed by the letter b. Thus, for example, the conducting portions of commutating section 54 bear the reference numeral 54a, while the insulating portion of that section bears the reference numeral 54b.

To provide the above-described current flow to the current electrodes 22 and 24, the conductors 15 and 16 are respectively connected to brushes 54c and 54d in engagement with diametrically opposed portions on the outer periphery of commutating section 54 whereby each of these brushes alternately comes into contact first with one of the conducting portions 54a, next with the insulating portion 54b and then with the other conducting portion. Brushes 54e and 54f, each of which is in continuous engagement with one of the two conducting portions 54a, are connected in series with a power adjusting means 64, illustrated as a variable resistor, a current or power measuring means 65, and the source of direct current 51 which is illustrated as a battery. From the foregoing description, it will be apparent that a D. C. potential difference is continuously applied across the two conducting portions 54a of the commutating section 54 by brushes 54e and 54f. Thus, as the commutating section 54 is rotated the brushes 54c and 54d are first electrically connected to the positive and negative terminals, respectively, of battery 51, are then both connected to the insulating portion of commutating section 54, and are then connected electrically to the negative and positive terminals, respectively, of battery 51. Thus, in effect, the commutating section 54 reverses the connection between the two input leads from battery 51 and the two output brushes 54c and 54d in order to convert the D. C. source of power into a square wave alternating current source. It will be observed that, during each interval when brushes 54c and 54d are in engagement with the conducting portions 54a, a difference of potential is established by conductors 15 and 16 between current electrodes 22 and 24 in the investigation apparatus 21 in order to produce a flow of current through the formations surrounding the borehole. This current flow is produced by the difference of potential existing between brushes 54c and 54d which, as illustrated by the solid line curve 85 in Fig. 2, is a periodically reversed rectangularly shaped wave having a frequency dependent upon the rate of rotation of shaft 63a. During each portion of the cycle when current flows through conductor 16, a potential drop is established across a series connected resistor 36, which potential drop is, in turn, impressed across coil 35a of the relay 35, thereby to energize the relay and bring the movable arms 32, 33, and 34 into respective engagement with the fixed contacts 32b, 33b, and 34b. Under the latter conditions, conductors 17, 18, and 19, are respectively connected to "lateral" potential electrodes 27, 28, and 29. Thus, during each interval when brushes 54c and 54d are in engagement with the conducting portions 54a of the commutating section 54, the potential differences existing between each "lateral" electrode and the remote electrode 30 are applied to commutating sections 56, 57, and 58 at the surface equipment 50 in order to produce simultaneously three lateral resistivity measurements in a manner to be described hereinafter. Obviously, if desired, the current from commutating section 54 may be caused to flow directly through the coil 35a of the relay in which case the resistor 36 may be eliminated. Therefore, the commutating section 54 together with source 51 and its associated circuit elements provide the current flow for producing the lateral resistivity measurements and may be collectively termed the lateral power source.

For the purpose of inducing a flow of current between a remote current electrode 72 and the current electrode 22 of the downhole equipment between the intervals when commutating section 54 is effective to energize electrodes 22 and 24, commutating section 55 functions to convert the D. C. potential from battery 52 to a periodically reversed rectangular wave. To this end, brushes 55e and 55f, connected in series with the direct current source 52, current measuring meter 73, and power control means 74, continuously engage the two conducting portions 55a of commutating section 55, thereby to apply a D. C. potential thereacross. Obviously, if desired, a common current source may be used to energize commutating sections 54 and 55 instead of employing the separate sources 51 and 52 illustrated. In any event, diametrically opposed brushes 55c and 55d, constituting the output terminals for the voltage delivered by commutating section 55, are alternately brought into engagement with different ones of the input brushes 55e and 55f as the commutating section 55 is rotated. This reversal of the electrical contact between input and output leads of the commutating section 55 produces a square wave potential difference between brushes 55c and 55d which is applied to the earth formations between the downhole electrode 22 and surface electrode 72 and is represented by the dotted line wave 86 shown in Fig. 2. While the output brush 55c is illustrated as being electrically connected to the ground electrode 72 at the earth's surface, it will be recognized that, if desired, this brush could, in the alternative, be connected to a remote current electrode carried by the investigation apparatus 12.

The conducting portions of commutating sections 55 are identical to the conducting portions of section 54 but are oriented in a position upon shaft 63a which is displaced by 90° from the conduction portions 54a. Due to this orientation, output brushes 54c and 54d engage the conducting portions of section 54 during the interval when output brushes 55c and 55d engage the insulating portions of section 55. Moreover, during the interval when the brushes 54c and 54d are in engagement with the insulating portion of commutating section 54, the brushes 55c and 55d engage the conducting portions of the commutating section 55. As a result, the currents from sources 51 and 52 are caused to flow alternately to their associated current electrodes with only one current flowing at any particular time.

Thus, during the interval when commutating section 55 is effective to cause a current flow through the earth formations between electrodes 22 and 72, commutating section 54 is ineffective with the result that no current flows through conductor 16. In the absence of the latter current flow, the coil 35a of relay 35 is deenergized and arms 32, 33, and 34 respectively engage fixed contacts 32a, 33a, and 34a thereby to connect conductors 17, 18, and 19 to the "normal" potential electrodes 23, 25, and 26, respectively. The A. C. square wave differences of potential existing between the normal electrodes and the remote electrode 30 are applied to commutating sections 59, 60, and 61 where they are mechanically rectified in order to produce simultaneously three "normal" resistivity measurements in a manner to be described more fully hereinafter. Thus, the commutating section 55, the direct current source 52 and their associated circuit elements provide current flow through the earth formations for producing the normal resistivity measurements and, hence, may be termed the "normal" power source.

As a result of the alternate flow of current from commutating sections 54 and 55, there appears between the remote electrode 30 and each of the potential electrodes 23, 25, 26, 27, 28 and 29 a pair of A. C. square wave differences of potential resembling the waves 85 and 86 shown in Fig. 2. However, during each of the intervals when current flows between electrodes 22 and 24, the "normal" electrodes 23, 25, and 26 are disconnected from the cable conductors 17, 18, and 19 by the switching mechanism 31, with the result that the differences of potential resulting from current flow from commutating section 54 are not applied to the surface equipment 50 from the "normal" electrodes. In other words during all of the intervals when the wave resembling the wave 85 is of an amplitude different from zero, the "normal" electrodes are not connected to conductors 17, 18 and 19 and, accordingly, this wave is not transmitted to the surface equipment. However, during these particular intervals the "lateral" electrodes are connected by switching mechanism 31 to conductors 17, 18, and 19 with the result that the square wave differences of potential existing between remote electrode 30 and each "lateral" electrode are applied to the commutating sections 56, 57 and 58. During each interval of current flow between electrode 22 and ground electrode 72 as a result of the operation of commutating section 55 the "lateral" electrodes 27, 28 and 29 are disconnected by switching mechanism 31 from the cable conductors 17, 18 and 19. Accordingly, the square wave potentials resembling wave 86 appearing between each "lateral" electrode and the remote electrode 30 are not transmitted to the surface equipment. The square wave signals produced by commutating section 55 are, however, effective to excite the "normal" electrodes 23, 25 and 26 during each of the intervals when they are respectively connected to cable conductors 17, 18 and 19 and, accordingly, these square wave signals are transmitted to the commutator 53 at the earth's surface. Thus, the operation of the switching mechanism 31 in synchronism with the alternate flow of current to the current electrodes of the downhole equipment, in addition to the beneficial results described above with respect to economy of cable conductors, has another very important effect in that such operation effectively eliminates one of the two signals appearing between each potential electrode and the remote electrode 30. Since each of the conductors 17, 18 and 19 is alternately connected to one of the "normal" electrodes and to one of the "lateral" electrodes, the differences of potential existing between each of these electrodes and remote electrode 30 are applied to commutator 53. Thus, there appears between each of the conductors 17, 18, and 19 and the conductor 20, a pair of A. C. square wave differences of potential having wave shapes resembling the waves 85 and 86 shown in Fig. 2 both of which are applied to the commutating sections 56 to 61, inclusive, at the surface.

Turning now to a description of the apparatus for producing the lateral resistivity measurements mentioned above, it will be observed that the two conducting portions of the three commutating sections 56, 57, and 58 are effective to energize their associated measuring circuits 56g, 57g, and 58g in time correlation with operation of the commutating section 54. Since the conducting portions of commutating sections 56, 57 and 58 are somewhat smaller than the corresponding conducting portions 54a of the commutating section 54, the circuits to the measuring devices are not completed until approximately 30 electrical degrees after the power is established through section 54. The circuits to the measuring devices also open slightly before the current flow from commutating section 54 is interrupted. Thus, the measuring devices 56g, 57g and 58g are each rendered effective for only a portion of each of the intervals of current flow from commutating section 54 and are rendered ineffective during all of the instants of reversal in the square wave currents flowing from each of the commutating sections 54 or 55. As a result, the noise and spurious signals caused by transients and disturbances resulting from inductive surges in the cable conductor during these instants of current reversal are prevented from entering the measuring circuits and the resistivity measurements are not made until a steady state condition is reached on the cable. Moreover, after the power is applied to the cable from the commutating section 54 a few milliseconds are required for the relay 35 in the subsurface tool to move from one position to another. The difference in size between conducting portions 54a and the corresponding conducting portions of commutating sections 56, 57 and 58 assures that the contacts of this relay are in proper position before the measuring devices are rendered effective. As previously mentioned, the input signals to each of the commutating sections 56, 57, and 58 comprises a pair of square wave signals having wave shapes resembling those of the waves 85 and 86 shown in Fig. 2. Moreover, as indicated above, the input and output leads to each of the commutating sections 56, 57 and 58 are periodically reversed in time correlation with the reversal taking place at the commutating section 54 with the result that a portion of the A. C. square wave signal having a wave shape resembling that of the curve 85 is mechanically rectified in order to produce a unidirectional signal illustrated by the wave 87 in Fig. 2. The periodic reversal between input and output leads of each of these commutating sections has another important effect in that the square wave having a shape resembling that of the curve 86 in Fig. 2 is effectively eliminated and produces no response across the output terminals of these commutating sections. Specifically, input brushes 56c, 57c, and 58c are electrically connected together and to the remote electrode 30 through cable conductor 20 and each of these brushes is in continuous engagement with one of the conducting portions on its associated commutating section. Input brushes 56d, 57d, and 58d, each of which is in continuous engagement with the other conducting portion on its associated commutating section, are respectively connected to cable conductors 18, 19, and 17. Thus, the A. C. potential difference existing between the remote electrode 30 and the "lateral" potential electrode 28 is impressed through conductors 18 and 20 across the two conducting portions 56a of commutating section 56 by input brushes 56c and 56d, the difference of potential existing between remote electrode 30 and "lateral" potential electrode 29 is impressed through conductors 19 and 20 across the two conducting portions 57a of commutating section 57 by input brushes 57c and 57d, and the difference of potential existing between the remote electrode 30 and "lateral" potential electrode 27 is impressed through conductors 17 and 20 across the conducting portions 58a of commutating section 58 by input brushes 58c and 58d. All three of these signals are produced by and are in phase with the current wave 85 as it flows in the formations between current electrodes 22 and 24.

The A. C. square wave potential difference between the "normal" potential electrode 25 and remote electrode 30 is impressed through conductors 18 and 20 across input brushes 56c and 56d, the A. C. potential difference between the "normal" potential electrode 26 and remote electrode 30 is impressed across input brushes 57c and 57d, and the A. C. potential difference between the "normal" electrode 23 and remote electrode 30 is impressed through cable conductors 17 and 20 to input brushes 58c and 58d. All three of the latter differences of potential are produced by and are in phase with the current wave 86 flowing in the formations between electrodes 22 and 72.

Diametrically opposed output brushes 56e and 56f are each alternately engaged by the conducting and insulating portions of commutating section 56 with the result that electrical contact between input and output brushes is alternately reversed at time instants somewhat displaced from the reversals of the A. C. square wave resembling wave 85 applied to the input brushes. Thus, the output brushes 56e and 56f are in engagement with the insulating portions 56b of commutating section 56 during all intervals when the signal resembling wave 86 possesses an amplitude other than zero and, accordingly, this particular input signal does not appear across the output brushes. The alternate reversal of electrical contact between input and output brushes causes the commutating section 56 to rectify a portion of the input signal resembling wave 85 in order to produce a unidirectional signal illustrated by wave 87 for passage through filter section 66, comprising resistor 66a, inductor 66b and condenser 66c, to a recording indicator 67. This indicator may be of the conventional recording galvonometer type producing upon a suitable recording medium a continuous curve of the resistivity of the borehole formations at the various depths of penetration of the investigation apparatus 12. In this connection, it will be understood that, in accordance with conventional well logging procedure, the recording mediums associated with each of the recording indicators of the apparatus illustrated in Fig. 1 are driven in synchronism with the sheave 14 raising and lowering the investigation apparatus, thereby producing continuous curves of the resistivity of the earth formations within the borehole as a function of borehole depth. The filter section 66 functions to smooth out the unidirectional signal applied thereto from brushes 56e and 56f in order to produce a D. C. signal for energizing the indicator 67. The recording indicator 67 thus indicates the difference of potential existing between electrodes 28 and 30 as a result of current flow from electrodes 22 and 24 and produces a three electrode measurement which may be termed an "intermediate lateral" resistivity curve, due to the spacing between the effective electrodes employed.

In similar manner, portions of the A. C. square wave differences of potential established by energizing current waves 85 and 86 are applied by input brushes 57c and 57b across the conducting portions 57a of commutating section 57 from cable conductors 19 and 20. The output signals from commutating section 57 are developed across output brushes 57e and 57f and applied through filter section 68, comprising resistor 68a, inductor 68b and condenser 68c, to recording indicator 69. Since the commutating section 57 functions in the manner described above to eliminate the input signal produced by energizing current wave 86 and to rectify a portion of the input signal produced by energizing wave 85, the output signal appearing across brushes 57e and 57f is a unidirectional signal having a wave shape resembling wave 87 in Fig. 2. This unidirectional signal is passed through filter section 68 in order to produce a D. C. signal for exciting the indicator 69. The latter indicator thus measures the difference of potential existing between electrodes 29 and 30 as a result of current flow between electrodes 22 and 24 and, hence, provides a three electrode measurement which may be termed a long lateral resistivity curve due to the spacing between the effective electrodes.

Similarly, the two A. C. square wave differences of potential respectively produced by energizing current waves 85 and 86 are applied through conductors 17 and 20 and through input brushes 58c and 58d to commutating section 58. The latter commutating section functions to eliminate the signal produced by formation energizing current wave 86 and to rectify the signal produced by formation energizing current wave 85 in order to produce a unidirectional signal for application through filter section 70, comprising resistor 70a, inductor 70b and condenser 70c, to a recording indicator 71. The latter indicator provides a measurement of the difference of potential existing between electrodes 27 and 30 as a result of current flow between electrodes 22 and 24 and provides a three electrode resistivity curve, termed a "short lateral" curve. Thus, the commutating sections 56, 57 and 58 together with their associated indicating apparatus function to produce simultaneously three differently spaced three-electrode apparent resistivity measurements indicative of different electrical characteristics of the formations adjacent the borehole at various depths of penetration of the investigation apparatus 12.

Turning now to a description of the apparatus for producing three "normal" resistivity curves simultaneously with the three "lateral" resistivity curves just described, it will be observed that the differences of potential existing between the "normal" potential electrodes 23, 25, and 26 and remote electrode 30 are applied to commutating sections 59, 60 and 61 during those intervals when the switching mechanism 31 is effective to connect the "normal" electrodes to the cable conductors 17, 18, and 19. Thus, the A. C. square wave difference of potential existing between electrode 25 and remote electrode 30 and produced by the formation energizing current with wave shape 86 is applied through cable conductors 18 and 20 to input brushes 59c and 59d in respective engagement with the spaced conducting portions 59a of the commutating section 59. As indicated above, there also appears between cable conductors 18 and 20 an A. C. square wave signal representative of the difference of potential existing between "lateral" electrode 28 and remote electrode 30 produced by the formation energizing current with wave shape 85. In order to provide an indication of the potential difference existing between electrodes 25 and 30, diametrically opposed output brushes 59e and 59f are connected in series with the filter section 75, comprising resistor 75a, inductor 75b and condenser 75c, and a recording indicator 76. The diametrically opposed brushes 59e and 59f are alternately engaged by the conducting and insulating portions of the commutating section 59 which are synchronized with corresponding portions of the commutating section 55 in such manner that a portion of signal produced by the energizing current having wave shape 86 is passed through the commutating section 59 while the A. C. square wave signal produced by the energizing current with wave shape 85 is eliminated from the measuring circuit indicated generally by reference numeral 59g. Since the electrical circuits between input and output brushes through the conducting portions of commutating section 59 are periodically reversed in time correlation with the reversal of current flow from the commutating section 55, a portion of the A. C. square wave produced by energizing current with wave shape 86 is rectified to produce a unidirectional signal having a square wave configuration as illustrated by the curve 88 shown in Fig. 2. The filter section 75 functions to smooth out the unidirectional signal developed across output brushes 59e and 59f and, hence, induces the indicator 76 to produce a continuous resistivity measurement of the potential difference existing between electrode 25 and remote electrode 30 as a result of current flow between electrode 22 and ground electrode 72. The resulting curve is a two electrode measurement of the resistivity of the formations traversed by the borehole while, due to the spacing between the effective electrodes, may be termed an "intermediate normal" curve.

In similar manner, the A. C. difference of potential existing between electrodes 29 and 30 and produced by the formation energizing current with wave shape 86 is applied through conductors 19 and 20 to input brushes 60c and 60d in engagement with the conducting portions of commutating section 60. The conductors 19 and 20 also apply across brushes 60c and 60d the A. C. difference of potential existing between electrodes 29 and 30 and produced by formation energizing current with wave shape 85. Commutating section 60 functions in the manner described above to eliminate from measuring circuit 60g the signal produced by energizing current with wave shape 85 and to rectify a portion of the signal produced by energizing current with wave shape 86 in order to supply a unidirectional signal appearing across output brushes 60e and 60f through filter section 77 to the recording indicator 78. The indicator 78 provides a measurement of the potential difference between electrodes 25 and 30 as a result of current flow between electrodes 22 and 72 at each of the various borehole depths traversed by the apparatus 12 which may be termed a "long normal" curve.

Similarly, the A. C. square wave signal appearing between electrodes 23 and 30 and produced by energizing current with wave shape 86 is applied through conductors 17 and 20 to input brushes 61c and 61d in continuous engagement with the conducting portions of commutating section 61. Conductors 17 and 20 also apply across brushes 61c and 61d the A. C. square wave difference of potential existing between electrodes 27 and 30 produced by energizing current with wave shape 85. Commutating section 60 functions to eliminate the signal produced by energizing current wave 85 and to rectify a portion of the signal produced by energizing current wave 86 in order to deliver a unidirectional signal having a shape corresponding to the wave 88 shown in Fig. 2 from diametrically opposed output brushes 61e and 61f through filter section 79 to recording indicator 80. The latter indicator provides a two electrode resistivity curve of the difference of potential between electrodes 23 and 30 as a result of current flow between electrodes 22 and 72 which curve may be termed a "short normal" measurement.

From the foregoing explanation, it is apparent that the synchronous operation of the commutating sections 55, 59, 60 and 61 results in the production of three different two electrode or normal resistivity curves simultaneously with the three lateral resistivity curves produced by recording indicators 67, 69 and 71. Any D. C. difference of potential existing between the remote electrode 30 and each of the other poential electrodes as a result of natural earth potentials is converted by the commutating sections to an A. C. or periodically reversed signal which may be eliminated by the filter sections. As a result, the resistivity measurements described above are completely free of the effects of these undesired differences of potential.

In order to provide a self potential or natural earth potential curve simultaneously with the six resistivity curves described above, direct current signals collected by electrode 23 are applied through conductor 17 to commutating section or rotary interrupter 62. Specifically, electrode 23 is connected through contacts 32a and arm 32 to conductor 17 and then to input brush 62c in continuous engagement with the conducting portion 62a of commutating section 62. Thus, during the intervals when conductor 17 is connected to the normal electrode 23, the latter serves as a "normal" potential electrode collecting square wave A. C. signals and a collector of D. C. natural earth potentials. Since the signals from electrode 23 are applied to the commutating section 62 only during those intervals when movable arm 32 is in engagement with fixed contact 32a, the natural earth potentials are supplied as unidirectional pulses illustrated by wave 89 in Fig. 2. As a result of current flow between electrodes 22 and 72, an A. C. square wave signal produced by and resembling wave 86 excites electrode 23, a portion of which appears between conductor 17 and ground. Moreover, during a portion of the intervals when electrode 23 is disconnected from conductor 17, there appears between conductor 17 and ground a portion of the square wave difference of potential from lateral electrode 27 produced by and resembling current wave 85. In addition, a portion of the D. C. natural earth potentials picked up by electrode 26 is present as unidirectional pulses illustrated by wave 92 in Fig. 2, which appears on conductor 17. As indicated above, both of the A. C. square wave signals and the two unidirectional signals appearing between conductor 17 and ground are applied to the input brush 62c of commutating section 62 which is designed to pass current to output brush 62d in synchronism with the passage of signals through commutating sections 59, 60 and 61. Output brush 62d is connected to input brush 62c twice during each revolution of the shaft 63a and, hence, a portion of the natural earth potentials represented by the wave 89 is passed to filter section 82 as illustrated by wave 93 shown in Fig. 2. Since the output brush 62d is connected to the input brush 62c when the wave 92 is at zero level, this unidirectional signal does not appear at the output brush 62d. The alternating current square wave signal produced by current flow between electrodes 22 and 24 is also eliminated by proper timing of the alternate connections between input brush 62c and output brush 62d by commutating section 62. A portion of the atlernating current square wave signals resulting from current flow between electrodes 22 and 72 resembling wave 86 appears across output brush 62d and ground as an alternating current signal illustrated by the wave 95 shown in Fig. 2. The filter section 82 is designed to reject the A. C. signal represented by wave 95 and to pass and smooth out the unidirectional signal represented by the wave 93. The direct current signal passed by filter section 82 to the indicator 83 provides a continuous self potential measurement of the natural earth potentials collected by electrode 23 at all borehole depths, thereby to record a self potential curve simultanously with the six resistivity curves described above. A direct current blocking condenser 81 effectively isolates the self potential measuring circuits from the remote electrode 30 during the time that signals are measured through commutating section 61 without distributing the flow of A. C. square wave signals into commutating section 61.

Turning now to a brief description of the operation of the system described above, it will be apparent that rotation of the commutator 63 at substantially constant speed as the investigation apparatus 12 is raised or lowered within the borehole 10 produces a periodically reversed current flow between current electrodes 22 and 24. This alternating current wave is effective to excite the "lateral" electrodes 27, 28, and 29 which, in cooperation with the remote electrode 30, supply energizing signals to commutating sections 56, 57, and 58. The latter commutating sections function to rectify the square wave signals appearing between each "lateral" electrode and remote electrode 30 and provide unidirectional signals for energizing indicators 67, 69, and 71 in order to produce three simultaneous "lateral" resistivity curves.

The commutating section 55 is effective to supply a periodically reversed alternating current flow between electrode 22 and ground electrode 72 in order to excite the "normal" potential electrodes 23, 25, and 26. The latter electrodes cooperate with the remote electrode 30 to apply signals across commutating sections 59, 60, and 61 which are rectified in order to produce unidirectional signals for passage through associated filter sections to indicators 76, 78, and 80, respectively, thereby to provide three simultaneous "normal" resistivity indications.

The switching mechanism 31 in the downhole equipment is operated in synchronism with the alternate flow of current from commutating sections 54 and 55 in order alternately to connect each of the cable conductors 17, 18, and 19 first to one of the lateral potentials and then to one of the normal potential electrodes thus economizing upon the number of cable conductors required. The self potential signals appearing between electrode 23 and ground are applied through commutating section 62 to indicator 83 in order to provide an indication of the self potential or natural earth potential simultaneously with the six resistivity measurements just described. Therefore, by employing a cable having six conductors, it is possible to produce simultaneously six resistivity curves together with a self potential curve. Heretofore, the maximum number of curves produced with a six conductor cable has been three resistivity curves together with the self potential or natural earth potential curve. It should be recognized that the number of resistivity curves attainable with the apparatus of the present invention may be increased by providing additional conductors in the cable together with an additional pair of electrodes for each additional conductor, thereby to produce two additional resistivity curves for each conductor added. Alternatively, the number of resistivity curves may be reduced by eliminating one of the conductors in the cable and eliminating two of the electrodes in the downhole equipment thus reducing the number of resistivity curves produced by two. In the apparatus described above, wherein one conductor is required for the remote electrode 30 and two additional conductors are required for the current electrodes 22 and 24, the minimum number of conductors that may be employed is four. Thus, in the system described above the number of resistivity curves which may be produced is related to the number of conductors in the cable in the following manner:

$$x = (n-3)2$$

in which $x$ equals the number of resistivity curves simultaneously produced and $n$ equals the number of conductors in the cable. Thus, by the use of the apparatus of the present invention, it is possible to produce an increased number of resistivity curves without an attendant increase in the number of cable conductors or, in the alternative, to produce a desired number of resistivity curves with fewer cable conductors.

It should be recognized that the positional arrangement of the potential and current electrodes as shown in Fig. 1 is purely illustrative and that actually the spacing of the electrodes may be altered to produce different resistivity curves if desired. Thus, for example, as illustrated in Fig. 3, the brushes 56c, 57c, 58c, 59c, 60c and 61c, which are all connected together, may be connected to a ground electrode 72a and the output brush 55c of commutating section 55 may be connected through cable conductor 20 to the remote electrode 30, thereby reversing the connections shown in Fig. 1. Moreover, the commutating section 62 may be eliminated by employing the arrangement illustrated in Fig. 3, wherein the self potential curve is produced by measuring electrodes which are common to the short normal resistivity measuring apparatus. Specifically, in the arrangement shown in Fig. 3, the conductor 17 leading to the investigation apparatus 12 is connected through condenser 81, shunted by filter section 82 and the recording indicator 83 to commutating section 61. The latter commutating section passes both the A. C. square wave signal appearing between subsurface electrode 23 and ground electrode 72a as a result of the energizing current flow between subsurface electrodes 22 and 30 and the D. C. self potential signals appearing between the same measuring electrodes. The D. C. self potential signals appearing between electrodes 23 and 72a are developed across condenser 81 where they are measured by the shunt circuit comprising filter section 82 and recording indicator 83. The D. C. self potential signal, appearing as a square wave signal across the output brushes 61e and 61f, flows through by-pass condenser 84 to complete its circuit. A portion of the A. C. square wave signal produced by formation energizing current flowing between electrodes 22 and 30 passes through the condenser 81 to commutating section 61 where it is converted to a unidirectional signal for producing the short normal resistivity curve in the manner described above. It will be observed that the unidirectional self potential signals recorded by indicator 83 do not affect the indicator 80 by virtue of the fact that these signals are converted by commutating section 61 to an A. C. square wave which may be eliminated by filter section 82.

It should be recognized that in Fig. 1 ground electrode 72 used as a current return for commutating section 55 could be connected through a cable conductor to a suitable subsurface electrode. In this modification of the apparatus of the present invention, wherein one conductor is required for the remote electrode and three electrodes are required for the remote electrodes, the minimum number of conductors employed is five. Thus, in such a system the number of resistivity curves which may be produced is related to the number of conductors in the cable in the following manner:

$$x = (n-4)2$$

in which $x$ equals the number of resistivity curves simultaneously produced and $n$ equals the number of conductors in the cable.

While the apparatus of the present invention has been described in conjunction with electrical resistivity measuring devices, it will be understood, of course, that the subsurface switching technique can be employed with equal facility in any system wherein a plurality of signal collection devices of any nature have been employed in the bore hole and a cable is connected to the surface equipment for transmitting the collected signals.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In an apparatus for electrically logging oil wells or the like to determine the electrical characteristics of earth formations adjacent the borehole, the combination of; a cable having a plurality of conductors; equipment mounted on said cable to be lowered into the borehole thereby, said equipment including at least two spaced current electrodes respectively connected to a first and a second of said conductors and at least one pair of spaced apart potential electrodes associated with a third signal conductor in said cable; a commutator having a plurality of commutating sections; means including a source of current and two of said commutating sections for alternately applying current to said two current electrodes in order to create two alternating fields in said formations; switching means for alternately connecting said third signal conductor to the potential electrodes of its associated pair; means for actuating said switching means in synchronism with the alternate application of current to said two current electrodes; and a pair of indicating means respectively including a second and a third of said commutating sections and each connected to said signal conductor for separating and separately measuring the signals supplied to said signal conductor by said potential electrodes.

2. In an apparatus for electrically logging oil wells or the like to determine the electrical characteristics of earth formations adjacent the borehole the combination of; a cable having a plurality of conductors; equipment mounted on said cable to be lowered into the borehole thereby, said equipment including at least two spaced current electrodes respectively connected to a first and a second of said conductors and at least one pair of spaced apart potential electrodes associated with a third conductor in said cable; a commutator having a plurality of commutating sections; means including a source of current and two of said commutating sections for alternately applying current to said two current electrodes in order to create two alternating fields in said formations; switching means for alternately connecting said third conductor to the potential electrodes of its associated pair, said third conductor being connected to a third and a fourth of said commutating sections; means for actuating said switching means in synchronism with the alternate application of current to said two current electrodes; a first indicating means connected to said third commutating section in order to provide an indication of the effect of one of said alternating fields upon one of said potential electrodes; and a second indicating means connected to said fourth commutating section in order to provide an indication of the effect of the other of said alternating fields upon the other of said potential electrodes.

3. In an apparatus for electrically logging oil wells or the like to determine the electrical charateristics of earth formations adjacent the borehole the combination of; a cable having a plurality of conductors; equipment mounted on said cable to be lowered into the borehole thereby, said equipment including at least one current electrode connected to a first of said conductors and a pair of signal collecting means associated with a second conductor in said cable; a commutator having a plurality of commutating sections; means including a source of current and one of said commutating sections for alternately supplying current to said current electrode; switching means for alternately connecting said second conductor to the signal collecting means; and means for actuating said switching means in synchronism with the alternate application of current to said current electrode.

4. Apparatus for electrically logging oil wells or the like to determine the electrical characteristics of earth formations adjacent the borehole comprising, in combination; a cable having a plurality of conductors; equipment mounted on said cable to be lowered into the borehole thereby, said equipment including at least two longitudinally spaced current electrodes respectively connected to a first and a second of said conductors and a plurality of pairs of longitudinally spaced potential electrodes associated with other conductors in said cable, the total number of said electrodes exceeding the number of conductors in said cable; a commutator having a plurality of commutating sections; means including at least one source of current and two of said commutating sections for alternately applying current to said two current electrodes in order to create two alternating fields in said formations; switching means for alternately connecting each of said other conductors to the potential electrodes of its associated pair; means for actuating said switching means in synchronism with the alternate application of current to said two current electrodes; and a pair of indicating means associated with each of said other conductors, each of said indicating means being connected to a different one of said commutating sections, whereby one of the indicating means of each pair provides an indication representative of the effect of one of said alternating fields upon one of the potential electrodes alternately connected to its associated conductor and the other indicating means of each pair provides an indication representative of the effect of the other of said alternating fields upon the other potential electrode alternately connected to its associated conductor.

5. Apparatus for electrically logging oil wells or the like, comprising in combination a cable having a plurality of conductors including at least one current conductor; equipment mounted on said cable to be lowered into the borehole thereby, said equipment including at least two signal collecting means associated with a signal conductor; means for applying current through said current conductor; switching means for alternately connecting said signal conductor to each of said signal collecting means; means responsive to the current flow in said current conductor for controlling the actuation of said switching means; and indicating means associated with said signal conductor at the surface for providing at least two indications in response to signals from said two signal collecting means whereby at least two subjects of interest in the well bore may be investigated simultaneously.

6. Apparatus for electrically logging oil wells or the like, comprising in combination a cable having a plurality of conductors including at least one current carrying conductor; equipment mounted on said cable to be lowered into the borehole thereby, said equipment including at least two signal collecting means associated with a signal conductor; means for applying current through said current carrying conductor; switching means for alternately connecting said signal conductor to each of said signal collecting means; means responsive to the current flow in said current conductor for controlling the actuation of said switching means; at least two indicating means associated with said signal conductor at the surface for providing separate indications of the signals from each of said signal collecting means, whereby at least two subjects of interest in the well bore may be investigated simultaneously; and means for rendering said two indicating means alternately effective in time correlation with the operation of said switching means.

7. Apparatus for electrically logging oil wells or the like, comprising in combination a cable having a plurality of conductors including at least one current conductor; equipment mounted on said cable to be lowered into the borehole thereby, said equipment including at least two signal collecting means associated with a signal conductor; means for applying a periodically reversed current through said current conductor; switching means for alternately connecting said signal conductor to each of said signal collecting means; means responsive to the current flow in said current conductor for controlling the actuation of said switching means in synchronism with the periodic reversals in the flow of current in said current conductor; and indicating means associated with said signal conductor at the surface for providing at least two indications respectively representative of the signals collected by said signal collecting means whereby at least two subjects of interest in the well bore may be investigated simultaneously.

8. Apparatus for electrically logging oil wells or the like, comprising in combination a cable having a plurality of conductors including at least one current conductor; equipment mounted on said cable to be lowered into the borehole thereby, said equipment including at least two signal collecting means associated with a signal conductor; means for applying a periodically reversed current through said current conductor; switching means for alternately connecting said signal conductor to each of said signal collecting means; means responsive to the current flow in said current conductor for controlling the actuation of said switching means in synchronism with the periodic reversals in the flow of current in said current conductor; at least two indicating means associated with said signal conductor at the surface for providing separate indications of the signals from each of said signal collecting means, whereby at least two subjects of interest in the well bore may be investigated simultaneously; and means for rendering said two indicating means alternately effective in time correlation with the operation of said switching means.

9. Apparatus for electrically logging oil wells or the like, comprising in combination a cable having a plurality of conductors including at least one current conductor and a signal conductor; equipment mounted on said cable to be lowered into the borehole, said equipment including at least two signal collecting means associated with said signal conductor; means for applying current through said current conductor; switching means for alternately connecting said signal conductor to each of said signal collecting means; and means responsive to the current flow in said current conductor for controlling the actuation of said switching means.

10. Apparatus for electrically logging oil wells or the like, comprising in combination a cable having a plurality of conductors including at least one current conductor and a signal conductor; equipment mounted on said cable to be lowered into the borehole, said equipment including at least two signal collecting means associated with said signal conductor; means for applying an alternating current through said current conductor; switching means for alternately connecting said signal conductor to each of said signal collecting means; and means responsive to the current flow in said current conductor for controlling the actuation of said switching means in synchronism with the alternations in the current flowing in said current conductor.

11. Apparatus for electrically logging oil wells or the like, comprising in combination a cable having a plurality of conductors including a current conductor and a signal conductor; equipment mounted on said cable to be lowered into the borehole, said equipment including at least three signal collecting means associated with said signal conductor; means for applying an alternating current through said current conductor; switching means for alternately connecting said signal conductor to each of said signal collecting means; means responsive to the current flow in said current conductor for controlling the actuation of said switching means in synchronism with the alternations in the current flow in said current conductor; at least two indicating means associated with the signal conductor at the surface for providing separate indications of the signals from each of said signal collecting means, whereby at least two subjects of interest in the well bore may be investigated simultaneously, said indicating means including means for rendering the two indicating means alternately effective in time correlation with the operation of said switching means in order to separate the signals on said signal conductor.

12. Apparatus for electrically logging oil wells or the like, comprising in combination a cable having a plurality of conductors including a current conductor and a signal conductor; equipment mounted on said cable to be lowered into the borehole, said equipment including at least two signal collecting means associated with said signal conductor; means for applying a periodically reversed current to said current conductor; switching means for alternately connecting said signal conductor to each of said signal collecting means; and means responsive to the current flow in said current conductor for controlling the actuation of said switching means in synchronism with the periodic reversals in the flow of current in said current conductor.

13. Apparatus for electrically logging oil wells or the like, comprising in combination a cable having a plurality of conductors including a signal conductor and a current conductor; equipment mounted on said cable to be lowered into the borehole, said equipment including at least two signal collecting means associated with said signal conductor; a commutator having a plurality of commutating sections and located at the earth's surface; means including a source of current and a first of said commutating sections for applying a periodically reversed current through said current conductor; switching means for alternately connecting said signal conductor to each of said signal collecting means; means responsive to the current flow in said current conductor for controlling the actuation of said switching means in synchronism with the periodic reversals in the flow of current in said current conductor; and a pair of measuring systems respectively including a second and third of said commutating sections for separating and measuring the signals present on said signal conductor.

14. Apparatus for electrically logging oil wells or the like, comprising in combination a cable having a plurality of conductors including a signal conductor and a current conductor; equipment mounted on said cable to be lowered into the borehole, said equipment including at least two signal collecting means associated with said signal conductor; a commutator having a plurality of commutating sections and located at the earth's surface; means including a first of said commutating sections and a source of current for applying a periodically reversed current through said current conductor; switching means for alternately connecting said signal conductor to each of said signal collecting means; means responsive to the current flow in said current conductor for controlling the actuation of said switching means in synchronism with the periodic reversals in the flow of current in said current conductor; a pair of indicating means associated with said signal conductor at the surface for providing separate indications of the signals from each of said signal collecting means, whereby at least two subjects of interest in the well bore may be investigated simultaneously, said indicating means each including a different one of said commutating sections so that they are rendered alternately effective in synchronism with the actuation of said switching means, thereby separating the signals present on said signal conductor and permitting said two signal collecting means to share said signal conductor.

15. In an apparatus for electrically logging oil wells or the like, the combination of a cable having a plurality of conductors including a signal carrying conductor and a current conductor; equipment mounted on said cable to be lowered into the borehole, said equipment including a pair of spaced apart potential electrodes; means for alternately establishing two separate and distinct fields in the earth formations adjacent the borehole, at least one of said fields being established by current flow through said current conductor; switching means for alternately connecting said signal carrying conductor to said potential electrodes; and means responsive to the current flow in said current conductor for controlling the actuation of said switching means in synchronism with the alternate establishment of said fields.

16. In an apparatus for electrically logging oil wells or the like, the combination of a cable having a plurality of conductors including a signal carrying conductor and a current conductor; equipment mounted on said cable to be lowered into the borehole, said equipment including a pair of spaced apart potential electrodes; means for alternately establishing two separate and distinct fields in the earth formations adjacent the borehole, at least one of said fields being established by current flow through said current conductor; switching means for connecting said signal carrying conductor to said potential electrodes; means responsive to the current flow in said current conductor for controlling the actuation of said switching means in synchronism with the alternate establishment of said fields; and a pair of selective measuring systems associated with said signal carrying conductor for providing two indications, one of which is representative of the effect of the first of said fields upon one of said potential electrodes and the other of which is representative of the effect of the other of said fields upon the other of said potential electrodes.

17. In an apparatus for electrically logging oil wells or the like, the combination of a cable having a plurality of conductors including a signal carrying conductor and a current conductor; equipment mounted on said cable to be lowered into the borehole, said equipment including a pair of longitudinally spaced apart potential electrodes; means for alternately establishing two separate and distinct fields in the earth formations adjacent the borehole, at least one of said fields being established by current flow through said current conductor; switching means for alternately connecting said signal carrying conductor to said potential electrodes; means responsive to the current flow in said current conductor for controlling the actuation of said switching means in synchronism with the alternate establishment of said fields; a pair of selective measuring systems associated with said signal carrying conductor for providing two separate indications, one of which is representative of the effect of the first of said fields upon one of said potential electrodes and the other of which is representative of the effect of the other of said fields upon the other of said potential electrodes; a signal transmitting system including one of said potential electrodes for transmitting direct current signals through said signal carrying conductor to the earth's surface; and indicating means responsive to said direct current signals for providing an indication of the natural earth potential.

18. In an apparatus for electrically logging oil wells or the like, the combination of a cable having a plurality of conductors including a signal carrying conductor and a current conductor; equipment mounted on said cable to be lowered into the borehole, said equipment including a pair of spaced apart potential electrodes; means for alternately establishing two separate and distinct fields in the earth formations adjacent the borehole, at least one of said fields being established by current flow through said current conductor; switching means for alternately connecting said signal carrying conductor to said potential electrodes; means responsive to the current flow in said current conductor for controlling actuation of said switching means in synchronism with the alternate establishment of said fields; a pair of measuring systems at the earth's surface associated with said signal carrying conductor; and means for rendering said measuring systems alternately effective in synchronism with the alternate establishment of said fields in order to separate the signals present on said signal carrying conductor and permit one of said measuring systems to indicate the effect of the first of said fields upon one of the potential electrodes, while the other measuring system indicates the effect of the other field upon the other of said potential electrodes.

19. In an apparatus for electrically logging oil wells or the like, the combination of a cable having a plurality of conductors including a signal carrying conductor and a current conductor; equipment mounted on said cable to be lowered into the borehole, said equipment including a pair of spaced apart potential electrodes; means for alternately establishing two separate and distinct fields in the earth formations adjacent the borehole, at least one of said fields being established by current flow through said current conductor; switching means for alternately connecting said signal carrying conductor to said potential electrodes; means responsive to the current flow in said current conductor for controlling the actuation of said switching means in synchronism with the alternate establishment of said fields; a pair of measuring systems at the earth's surface associated with said signal carrying conductor, means for rendering said measuring systems alternately effective in synchronism with the alternate establishment of said fields in order to separate the signals present on said signal carrying conductor and permit one of said measuring systems to indicate the effect of the first of said fields upon one of the potential electrodes, while the other measuring system indicates the effect of the other field upon the other of said potential electrodes; a signal transmitting system including one of said potential electrodes and said signal carrying conductor for transmitting direct current signals to the earth's surface; and indicating means responsive to said direct current signals for providing an indication of the natural earth potential.

20. In an apparatus for electrically logging earth formations adjacent a borehole the combination of a cable having a plurality of conductors including a signal carrying conductor and a current conductor; equipment mounted on said cable to be lowered into the borehole, said equipment including a pair of spaced apart potential electrodes; means for alternately establishing two separate and distinct fields in the earth formations adjacent the borehole, at least one of said fields being established by current flow through said current conductor; switching means for alternately connecting said signal carrying conductor to first one and then the other of said potential electrodes; means responsive to the current flow in said current conductor for controlling the actuation of said switching means in synchronism with the alternate establishment of said fields, means including said one potential electrode and said signal carrying conductor for measuring a potential difference resulting from the first of said alternately established fields; and means including said other potential electrode and said signal carrying conductor for measuring a potential difference resulting from the second of said alternately established fields.

21. In an apparatus for electrically logging earth formations adjacent a borehole the combination of a cable having a plurality of conductors including a signal carrying conductor and a current conductor; equipment mounted on said cable to be lowered into the borehole, said equipment including a pair of spaced apart potential electrodes; a commutator including a plurality of commutating sections at the earth's surface; means including a first and second of said commutating sections and at least one source of direct current for alternately establishing two separate and distinct fields in the earth formations adjacent the borehole, at least one of said fields being established by current flow through said current conductor; switching means for alternately connecting said signal carrying conductor to first one and then the other of said potential electrodes; means responsive to the current flow in said current conductor for controlling the actuation of said switching means in synchronism with the alternate establishment of said fields, means including a third of said commutating sections, said one potential electrode and said signal carrying conductor for measuring a potential difference resulting from the first of said alternately established fields; and means including a fourth of said commutating sections, said other potential electrode and said signal carrying conductor for measuring a potential difference resulting from the second of said alternately established fields.

22. In an apparatus for electrically logging earth formations adjacent a borehole the combination of a cable having a plurality of conductors including a signal carrying conductor and a current conductor; equipment mounted on said cable to be lowered into the borehole, said equipment including a pair of spaced apart potential electrodes; a commutator including a plurality of commutating sections at the earth's surface; means including a first and second of said commutating sections and at least one source of direct current for alternately establishing two separate and distinct fields in the earth formations adjacent the borehole, at least one of said fields being established by current flow through said current conductor; switching means for alternately connecting said signal carrying conductor to first one and then the other of said potential electrodes; means responsive to the current flow in said current conductor for controlling the actuation of said switching means in synchronism with the alternate establishment of said fields, means including said one potential electrode and said signal carrying conductor for measuring a potential difference resulting from the first of said alternately established fields; means including said other potential electrode and said signal carrying conductor for measuring a potential difference resulting from the second of said alternately established fields; a signal transmitting system including said one potential electrode and said current carrying conductor for transmitting direct current signals to the earth's surface; and means responsive to said direct current signals for measuring natural earth potentials.

23. Apparatus for electrically logging earth formations adjacent a borehole, comprising in combination a cable having a plurality of conductors including a reference conductor connected to a reference electrode, a plurality of signal carrying conductors and a plurality of current conductors; means including a first and second of said current conductors respectively connected to first and second longitudinally and relatively closely spaced current electrodes for passing current through the borehole formations during spaced apart time intervals in order to establish a first field; means including said first conductor and a remotely positioned current electrode for passing current through the borehole formations between said spaced apart time intervals to create a second field which is established alternately with said first field; a plurality of pairs of longitudinally spaced apart potential electrodes cooperating with the reference electrode to sample said fields; each pair of potential electrodes being associated with one of said signal carrying conductors; switching means controlled by the flow of current through one of said current conductors for alternately connecting each signal carrying conductor to the electrodes of its associated pair in synchronism with the alternate establishment of said fields; a pair of indicating systems at the earth's surface associated with each of said signal carrying conductors, all of said indicating systems being connected through said reference conductor to said reference electrode; and means for rendering the indicating systems of each pair alternately effective in synchronism with the actuation of said switching means in order to separate the signals on each of said signal carrying conductors so that one of the indicating systems of each pair measures the potential difference existing between one of the potential electrodes and said reference electrode during each of said spaced time intervals to provide a lateral resistivity indication, while the other indicating system of each pair measures the potential difference existing between the other potential electrode of each pair and said reference electrode during the time periods between said spaced intervals in order to provide a normal resistivity measurement.

24. Apparatus for electrically logging earth formations adjacent a borehole, comprising in combination a cable having a plurality of conductors including a plurality of signal carrying conductors and a plurality of current conductors; a commutator including a plurality of commutating sections at the earth's surface; means including a first of said commutating sections and a first and second of said current conductors respectively connected to first and second longitudinally and relatively closely spaced current electrodes for passing current through the borehole formations during spaced apart time intervals in order to establish a first field; means including a second of said commutating sections, said first conductor and a remotely positioned current electrode for passing current through the borehole formations between said spaced apart time intervals to create a second field which is established alternately with said first field; a plurality of pairs of longitudinally and differently spaced potential electrodes cooperating with a remotely positioned reference electrode to sample said fields; each pair of potential electrodes being associated with one of said signal carrying conductors; switching means controlled by the flow of current through one of said current conductors for alternately connecting each signal carrying conductor to the electrodes of its associated pair in synchronism with the alternate establishment of said fields; a pair of indicating systems at the earth's surface associated with each of said signal carrying conductors; means connecting all of said indicating systems to said reference electrode; and means including a third and fourth of said commutating sections for rendering the indicating systems of each pair alternately effective in synchronism with the actuation of said switching means in order to separate the signals on each of said signal carrying conductors so that one of the indicating systems of each pair measures the potential difference existing between one of the potential electrodes and said reference electrode during each of said spaced time intervals to provide a lateral resistivity indication, while the other indicating system of each pair measures the potential difference existing between the other potential electrode of each pair and said reference electrode during the time periods between said spaced time intervals, in order to provide a normal resistivity measurement.

25. Apparatus for electrically logging earth formations adjacent a borehole, comprising in combination a cable having a plurality of conductors including a reference conductor connected to a reference electrode, a plurality of signal carrying conductors and a plurality of current conductors; means including a first and second of said current conductors respectively connected to first and second longitudinally and relatively closely spaced current electrodes for passing current through the borehole formations during spaced apart time intervals in order to establish a first field; means including said first conductor and a remotely positioned current electrode for passing current through the borehole formations between said spaced apart time intervals to create a second field which is established alternately with said first field; a plurality of pairs of longitudinally spaced apart potential electrodes cooperating with the reference electrode to sample said fields, each pair of potential electrodes being associated with one of said signal carrying conductors; switching means controlled by the flow of current through one of said current conductors for alternately connecting each signal carrying conductor to the electrodes of its associated pair in synchronism with the alternate establishment of said fields; a pair of indicating systems at the earth's surface associated with each of said signal carrying conductors, all of said indicating systems being connected through said reference conductor to said reference electrode; means for rendering the indicating systems of each pair alternately effective in synchronism with the actuation of said switching means in order to separate the signals on each of said signal carrying conductors so that one of the indicating systems of each pair measures the potential difference existing between one of the potential electrodes and said reference electrode during each of said spaced time intervals to provide a lateral resistivity indication, while the other indicating system of each pair measures the potential difference existing between the other potential electrode of each pair and said reference electrode during the time periods between said spaced intervals, thereby to provide a normal resistivity measurement; a signal transmitting system including one of said potential electrodes and one of the signal carrying conductors for transmitting direct current signals through the cable to the earth's surface; and indicating means responsive to said direct current signals for providing an indication of the natural earth potential.

26. In an apparatus for electrically logging the characteristics of earth formations adjacent a borehole, the combination of a cable having a plurality of conductors including a signal carrying conductor and a current carrying conductor; equipment mounted on said cable to be lowered into the borehole, said equipment including a current electrode and a pair of longitudinally spaced apart potential electrodes located different distances from said current electrode; means for alternately establishing two separate and distinct fields in the earth's formations adjacent the borehole, at least one of said fields being established by current flow through said current conductor to said current electrode; first signal collecting means including one of said potential electrodes for sampling a first potential difference resulting from said first field; second signal collecting means including the other of said potential electrodes for sampling a second potential difference resulting from said second field; switching means for alternately connecting said signal carrying conductor to said potential electrodes in synchronism with the alternate establishment of said fields; and a pair of indicating systems at the earth's surface associated with said signal carrying conductor and rendered alternately effective in synchronism with the operation of said switching means, thereby to separate the signals on said signal carrying conductor so that one of the indicating means measures the first potential difference and the other indicating means measures the second potential difference.

27. In an apparatus for electrically logging the characteristics of earth formations adjacent a borehole, the combination of a cable having a plurality of conductors including a signal carrying conductor and a current carrying conductor; equipment mounted on said cable to be lowered into the borehole, said equipment including a current electrode and a pair of longitudinally spaced apart potential electrodes located different distances from said current electrode; means for alternately establishing two separate and distinct fields in the earth's formations adjacent the borehole, at least one of said fields being established by current flow through said current conductor to said current electrode; first signal collecting means including one of said potential electrodes for sampling a first potential difference resulting from said first field; second signal collecting means including the other of said potential electrodes for sampling a second potential difference resulting from said second field; switching means for alternately connecting said signal carrying conductor to said potential electrodes in synchronism with the alternate establishment of said fields; a pair of indicating systems at the earth's surface associated with said signal carrying conductor and rendered alternately effective in synchronism with the operation of said switching means, thereby to separate the signals on said signal carrying conductor so that one of the indicating means measures the first potential difference and the other indicating means measures the second potential difference; a signal transmitting system including one of said potential electrodes and said signal carrying conductor for transmitting direct current signals to the earth's surface; and indicating means responsive to said direct current signals for providing an indication of the natural earth potential.

28. Apparatus for electrically logging the formations adjacent an oil well or the like comprising, in combination, a cable having a plurality of conductors including at least two current conductors and at least one signal-carrying conductor, means including pairs of current electrodes spaced apart longitudinally of the well and spaced differently with respect to each other and also including said two current conductors for establishing alternately two separate and distinct current fields in the formations adjacent the well, means including pairs of potential electrodes spaced apart longitudinally of the well and differently spaced with respect to said current electrodes and also including said signal-carrying conductor for sampling each of said alternately established fields, switching means for alternately connecting two of said potential electrodes to said signal-carrying conductor in synchronism with the establishment of said fields, means responsive to current flow in one of said current conductors for controlling the actuation of said switching means, and indicating means at the earth's surface associated with said signal-carrying conductor for separating the signals thereon and providing a plurality of indications in synchronism with the alternate establishment of said fields, said indications being representative of the difference of potential existing between the pairs of potential electrodes, thereby to provide two or more indications of the electrical characteristics of the earth's formations.

29. Apparatus for electrically logging the formations adjacent an oil well or the like comprising, in combination, a cable having a plurality of conductors including at least two current conductors and at least one signal-carrying conductor, means including pairs of current electrodes spaced apart longitudinally of the well and spaced differently with respect to each other and also including said two current conductors for establishing alternately two separate and distinct current fields in the formations adjacent the well, means including pairs of potential electrodes spaced apart longitudinally of the well and differently spaced with respect to said current electrodes and also including said signal-carrying conductor for sampling each of said alternately established fields, switching means for alternately connecting two of said potential electrodes to said signal-carrying conductor in synchronism with the establishment of said fields, means responsive to current flow in one of said current conductors for controlling the actuation of said switching means, indicating means at the earth's surface associated with said signal-carrying conductor for separating the signals thereon and providing a plurality of indications in synchronism with the alternate establishment of said fields, said indications being representative of the difference of potential existing between the pairs of potential electrodes, thereby to provide two or more indications of the electrical characteristics of the earth's formations, a signal-transmitting system including one of said potential electrodes for transmitting self potential signals through said signal-carrying conductor to the earth's surface, and indicating means responsive to said self potential signals for providing an indication of the natural earth potential.

30. Apparatus for electrically logging the formations adjacent an oil well or the like comprising, in combination, a cable having a plurality of current conductors and a plurality of signal conductors, means including pairs of current electrodes spaced apart longitudinally of the well and differently spaced with respect to each other and also including at least two of said current conductors individually connected to different ones of the current eelctrodes for establishing in a time sequence first and second current fields in the formations, a first sampling means including a pair of longitudinally spaced apart potential electrodes spaced from said current electrodes for sampling the first of said fields by making at least two measurements of the potential differences existing between each of the potential electrodes and a reference point, said sampling means including switching mechanism for normally individually connecting two of said signal conductors to said potential electrodes, said switching mechanism being actuated in response to the current flow in the current conductor employed for establishing the second of said fields and being actuated in synchronism with the establishment of said second field, said switching mechanism when actuated being effective to connect said two signal conductors individually to two additional differently and longitudinally spaced apart potential electrodes, and a second sampling means including said two additional electrodes for sampling the second of said fields, each of said sampling means including indicating means associated with the different signal conductors for providing in synchronism with the establishment of said fields at least two measurements of the potential differences created by the first of said fields and at least one measurement of the potential differences created by the second of said fields, thereby to provide at least three indications of the electrical characteristics of the earth formations.

31. Apparatus for electrically logging the formations adjacent an oil well or the like comprising, in combination, a cable having a plurality of current conductors and a plurality of signal conductors, means including pairs of current electrodes spaced apart longitudinally of the well and differently spaced with respect to each other and also including at least two of said current conductors individually connected to different ones of the current electrodes for establishing in a time sequence first and second current fields in the formations, a first sampling means including a pair of longitudinally spaced apart potential electrodes spaced from said current electrodes for sampling the first of said fields by making at least two measurements of the potential difference existing between each of the potential electrodes and a reference point, said sampling means including switching mechanism for normally individually connecting two of said signal conductors to said potential electrodes, said switching mechanism being actuated in response to the current flow in the current conductor employed for establishing the second of said fields and being actuated in synhcronism with the establishment of said second field, said switching mechanism when actuated being effective to connect said two signal conductors individually to two additional differently and longitudinally spaced apart potential electrodes, a second sampling means including said two additional electrodes for sampling the second of said fields, each of said sampling means including indicating means associated with the different signal conductors for providing in synchronism with the establishment of said fields at least two measurements of the potential differences created by the first of said fields and at least one measurement of the potential differences created by the second of said fields, thereby to provide at least three indications of the electrical characteristics of the earth formations, a signal-transmitting system including one of said potential electrodes for transmitting self potential signals through one of the signal conductors to the earth's surface, and indicating means responsive to said self potential signals for providing an indication of the natural earth potential.

References Cited in the file of this patent

UNITED STATES PATENTS

| | | |
|---|---|---|
| 2,393,009 | Chun | Jan. 15, 1946 |
| 2,654,064 | Broding | Sept. 29, 1953 |